US006366658B1

(12) United States Patent
Bjornberg et al.

(10) Patent No.: US 6,366,658 B1
(45) Date of Patent: Apr. 2, 2002

(54) TELECOMMUNICATIONS ARCHITECTURE FOR CALL CENTER SERVICES USING ADVANCED INTERACTIVE VOICE RESPONSIVE SERVICE NODE

(75) Inventors: Greg Bjornberg; Patrick Hamilton; Allen Holmes, all of Colorado Springs; Daniel Hutton, Elbert; Judy A. Moldenhauer, Colorado Springs; Phyllis D. Santa, Larkspur, all of CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/074,096

(22) Filed: May 7, 1998

(51) Int. Cl.[7] .................... H04M 3/42; H04M 11/00; H04M 3/00
(52) U.S. Cl. ............... 379/207; 379/88.18; 379/265
(58) Field of Search .................. 379/265, 266, 379/309, 212, 88.18

(56) References Cited

U.S. PATENT DOCUMENTS

| | | | |
|---|---|---|---|
| 4,797,910 A | 1/1989 | Daudelin | 379/67 |
| 4,845,739 A | 7/1989 | Katz | 379/92 |
| 4,930,150 A | 5/1990 | Katz | 379/93 |
| 5,048,075 A | 9/1991 | Katz | 379/92 |
| 5,128,984 A | 7/1992 | Katz | 379/92 |
| 5,133,004 A | 7/1992 | Heileman, Jr. et al. | |
| 5,165,095 A | 11/1992 | Borcherding | |
| 5,185,781 A | 2/1993 | Dowden et al. | |
| 5,251,252 A | 10/1993 | Katz | 379/92 |
| 5,255,309 A | 10/1993 | Katz | 379/88 |
| 5,259,023 A | 11/1993 | Katz | 379/88 |
| 5,325,421 A | 6/1994 | Hou et al. | |
| 5,349,633 A | 9/1994 | Katz | 379/88 |
| 5,351,285 A | 9/1994 | Katz | 379/94 |
| 5,353,339 A | 10/1994 | Scobee | |
| 5,519,772 A | 5/1996 | Akman et al. | |
| 5,533,115 A | 7/1996 | Hollenbach et al. | |
| 5,553,119 A | 9/1996 | McAllister et al. | |
| 5,802,146 A | 9/1996 | Dulman | |
| 5,561,707 A | 10/1996 | Katz | 379/88 |
| 5,572,583 A | 11/1996 | Wheeler, Jr. et al. | |
| 5,581,600 A | 12/1996 | Watts et al. | |
| 5,583,920 A | * 12/1996 | Wheeler, Jr. | 379/88 |

(List continued on next page.)

OTHER PUBLICATIONS

Perdue, Robert J. and Eugene L. Rissanon,"Conversant 1 Voice System Architecture and Applications," AT&T Technical Journal, pp. 34–47 (Sep./Oct. 1986).

Emerson, S. Thomas, "Voice Response Systems—Technology to the Rescue for Business Users", Speech Technology, pp. 99–103 (Jan./Feb. 1983).

Hester, et al., "The AT&T Multi–Mode Voice Systems—Full Spectrum Solutions for Speech Processing Applications", Proceedings of the 1985 AVIOS Conference, pp. 1,3,5,7 and 9 (Sep. 1985).

Moosemiller, John P., "AT&T's Conversant I Voice System", Speech Technology, pp. 88, 90 and 92 (Mar./Apr. 1986).

*Primary Examiner*—Creighton Smith
*Assistant Examiner*—Hector Agdeppa (57) ABSTRACT

A telecommunications network that handles call center calls by providing advanced interactive voice response (IVR) services using a next generation service node (NGSN). The NGSN nodes combine with several other interacting network components to provide a scaleable architecture which allows several different, customized and flexible call center services to be performed for telecommunications service provider customers. In addition the network includes virtual call routers, parking managers, host connect gateways, report servers, advanced network databases, data access points, and data gateways to deliver calls to customer call centers with various features enabled.

9 Claims, 8 Drawing Sheets

U.S. PATENT DOCUMENTS

| | | | |
|---|---|---|---|
| 5,689,553 A | 11/1997 | Ahuja et al. | |
| 5,692,033 A | 11/1997 | Farris | |
| 5,706,286 A | 1/1998 | Reiman et al. | |
| 5,742,905 A * | 4/1998 | Pepe et al. | 455/461 |
| 5,793,771 A | 8/1998 | Darland et al. | |
| 5,805,675 A | 9/1998 | Chanda | |
| 5,818,921 A | 10/1998 | Vander Meiden et al. | |
| 5,825,752 A | 10/1998 | Fujimori et al. | |
| 5,854,834 A | 12/1998 | Gottlieb et al. | |
| 5,867,494 A * | 2/1999 | Krishnaswamy et al. | 370/352 |
| 5,881,131 A | 3/1999 | Farris et al. | |
| 5,881,135 A | 3/1999 | Watts et al. | |
| 5,883,939 A | 3/1999 | Friedman et al. | |
| 5,915,008 A | 6/1999 | Dulman | |
| 5,917,900 A | 6/1999 | Allison et al. | |
| 5,920,562 A | 7/1999 | Christie et al. | |
| 5,923,659 A | 7/1999 | Curry et al. | |
| 5,923,859 A | 7/1999 | Melo et al. | |
| 5,926,524 A | 7/1999 | Taylor | |
| 5,930,348 A | 7/1999 | Regnier et al. | |
| 5,931,914 A | 8/1999 | Chiu | |
| 5,937,029 A | 8/1999 | Yosef | |
| 5,946,386 A * | 8/1999 | Rogers et al. | 379/265 |
| 5,953,389 A | 9/1999 | Pruettt et al. | |
| 5,956,396 A | 9/1999 | Ash et al. | |
| 5,974,252 A | 10/1999 | Lin et al. | |
| 5,987,118 A | 11/1999 | Dickerman et al. | |
| 5,987,331 A | 11/1999 | Grube et al. | |
| 5,995,610 A * | 11/1999 | Smidt et al. | 379/207 |
| 5,999,925 A | 12/1999 | Krishnaswamy et al. | |
| 6,003,031 A | 12/1999 | Hartikainen et al. | |
| 6,014,428 A | 1/2000 | Wolf | |
| 6,018,567 A | 1/2000 | Dulman | |
| 6,038,293 A * | 3/2000 | McNerney et al. | 379/88.19 |
| 6,041,325 A | 3/2000 | Shah et al. | |
| 6,044,142 A | 3/2000 | Hammarstrom et al. | |
| 6,044,144 A * | 3/2000 | Becker et al. | 379/265 |
| 6,044,259 A | 3/2000 | Hentila et al. | |
| 6,081,591 A | 6/2000 | Skoog | |
| 6,104,803 A | 8/2000 | Weser et al. | 379/230 |
| 6,108,410 A | 8/2000 | Reding et al. | |
| 6,111,893 A | 8/2000 | Volftsun et al. | |
| 6,122,345 A | 9/2000 | Johnson | |
| 6,134,311 A | 10/2000 | Ekstrom | |
| 6,137,862 A | 10/2000 | Atkinson et al. | |
| 6,144,727 A | 11/2000 | Mashinsky | |
| 6,198,813 B1 | 3/2001 | Pullen et al. | |
| 6,233,316 B1 | 5/2001 | Schier et al. | |

\* cited by examiner

TELECOMMUNICATIONS ARCHITECTURE FOR CALL CENTER SERVICES USING ADVANCED INTERACTIVE VOICE RESPONSIVE SERVICE NODE

CROSS-REFERENCE TO RELATED APPLICATIONS

This application is related to commonly-owned, co-pending applications filed concurrently herewith, entitled:

"Advanced Interactive Voice Response Service Node" having application Ser. No. 09/073,880;

"Interactive Voice Response Service Node with Advanced Resource Management" having application Ser. No. 09/074,142;

"Communications Signaling Gateway and System for an Advanced Service Node" having application Ser. No. 09/074,072;

"Service Provisioning System for Interactive Voice Response Services" having application Ser. No. 09/074,050;

"Call and Circuit State Machine for a Transaction Control Layer of a Communications Signaling Gateway" having application Ser. No. 09/073,885; and "System for Executing Advanced Interactive Voice Response Services Using Service-Independent Building Blocks" having application Ser. No. 09/073,887. The above applications are incorporated herein by reference in their entirety.

This application is also related to commonly-owned, co-pending applications, previously filed, entitled:

"Remote Data Gateway" having application Ser. No. 08/796,246, filed Feb. 7, 1997;

"Network Call Parking Manager" having application Ser. No. 08/796,839, filed Feb. 7, 1997;

"System and Method for Call Park and Transfer in a Telecommunications Network" having application Ser. No. 08/796,840, filed Feb. 7, 1997; and "Network Information Concentrator" having application Ser. No. 08/426,256, filed Apr. 21, 1995. The above applications are also incorporated herein by reference in their entirety.

BACKGROUND OF THE INVENTION

1. Field of the Invention

The present invention relates generally to computer telephony, and more particularly to an architecture for providing advanced interactive voice response services to handle calls on a telephone network.

2. Related Art

Call Center Services have become a popular offering of telecommunications service providers. A telecommunications service provider's customer, which is typically a business, uses one or more call centers to receive and process calls from their existing or potential customers (referred to as "callers"). The telecommunications service provider uses a communications network to deliver calls to call centers while employing various services in the process.

One group of services is known as Interactive Voice Response (IVR) services. It is common for a business to use IVR services in conjunction with call center services. The IVR services may be used to handle a call before routing it to a call center. Other IVR services include automated servicing of callers for customers, caller surveys, telemarketing, and call parking until a call center has an available resource (e.g., a customer service agent). By employing automated IVR services, a customer may reduce the total costs of handling a call and can more efficiently and effectively send a call to an appropriate call center destination.

Figure 1:
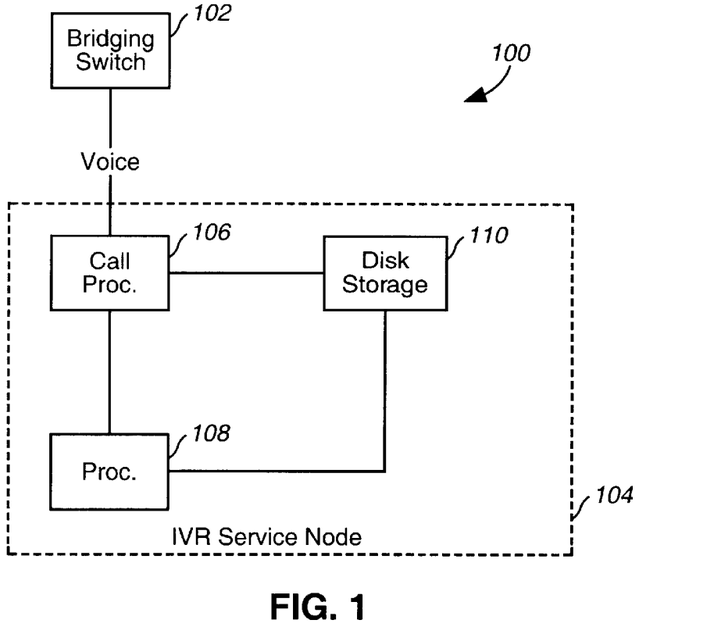
FIG. 1 is a block diagram illustrating the systems architecture of a conventional IVR service node.

Special service nodes in the communications network perform IVR services. An IVR service node typically includes of a network audio server that is connected via voice trunks to a bridging switch on a switch network, and an automated call processor that processes customer IVR applications. FIG. 1 illustrates a typical IVR service node systems architecture 100. Bridging switch 102 is connected to an IVR service node 104 via voice trunks. A call processor 106 is a network audio server that provides the telephony interface between the IVR Service Node 104 and the bridging switch 102. A computer processor 108 stores and executes customer application files to service a call. A disk storage 110 is employed to store customer audio files.

Figure 2:
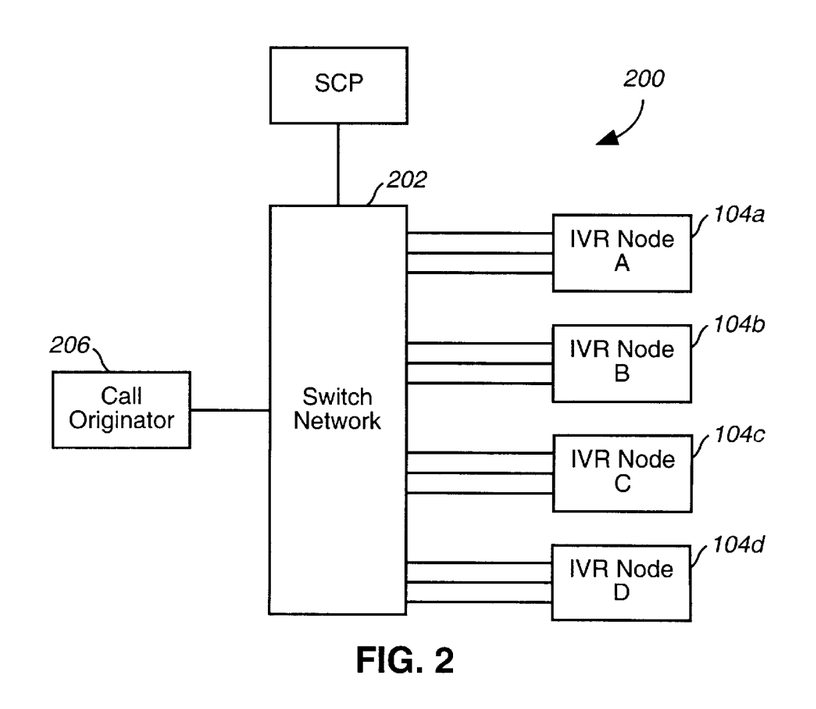
FIG. 2 is a block diagram illustrating a network configuration for providing IVR services in accordance with the conventional IVR technology.

FIG. 2 illustrates a conventional network configuration 200 for providing IVR services. The network configuration 200 includes a switch network 202, one or more IVR service nodes 104 (shown as IVR service nodes 104a–104d) and one or more service control points (SCP) 208. Each IVR service node 104 has access to switch network 202 through its own bridging switch 102 (not shown in FIG. 2). A call originator 206 dials a number and accesses the switch network 202 via an originating switch (not shown). The originating switch issues a query to the SCP 208 to determine where to route the call. Based on one or more criteria selected by the customer, such as the dialed number of a call, Dialed Number Identification Service (DNIS), Automatic Number Identification (ANI), time of day, caller-entered digits, geographic point of call origin, etc., the SCP 208 returns to the originating switch a routing address for a particular IVR service node 104. Each IVR service node 104 has little or no interaction with other network components. This results in a limited feature set that telecommunications service providers can offer to their customers.

In accordance with conventional IVR technology, IVR service node 104 is entirely proprietary to a single vendor. The IVR service node 104, which is physically a computing platform, is designed with both hardware and software dedicated to performing certain functions. Its design enables only certain types of applications to be serviced at a particular node. Furthermore, customers are beginning to demand more customized IVR applications that require specialized architectures. This results in network inefficiencies because multiple IVR service nodes 104 are then deployed within a network, each handling different applications. When a call for a particular application is originated, it must be routed to a particular IVR service node 104 irrespective of the node's load.

As shown in FIG. 2, the total capacity of network configuration 200 needed to handle all simultaneous IVR calls during a peak period must be divided among the multiple IVR service nodes 104 (shown as IVR service nodes 104a–104b). This results in many small trunk groups. In accordance with Erlang theories, dividing a large-capacity pipe into several small capacity pipes decreases the overall capacity of the network. Furthermore, as traffic demand for IVR services increases, additional IVR service nodes 104 must be added to the network configuration 200. This is because current IVR architectures are not scaleable.

The above described limitations result in low efficiency of current IVR service platforms and limited functionality of communications networks. Therefore, what is needed is a telecommunications network architecture for call center services which uses advanced IVR service nodes to increase efficiency, flexibility as well as reliability.

SUMMARY OF THE INVENTION

The present invention is directed to a system and method for a telecommunications network that handles call center calls by providing advanced interactive voice response (IVR) services. The system architecture includes a plurality of next generation service nodes (NGSN) that perform advanced IVR services. The system also includes a plurality of data access points, a signaling gateway, a service creation environment, local support element, database, report server, network information concentrator, host connect gateway, parking manager, virtual call router, and data gateway.

The method includes the steps of receiving a call routing query from the telecommunications network, where the routing query uses a carrier messaging system, processing the routing query to determine a physical routing address and an application identifier based on various criteria, and requesting resources on a NGSN identified by the physical routing address. Once a NGSN resource has been requested, a connection is established between the call and NGSN, and the customer application file is retrieved based on the application identifier and then executed.

One advantage of the present invention is that the network architecture allows customer application files to be executed from any NGSN node thereby increasing network efficiency.

Another advantage of the present invention is that the network architecture provides customers many supporting systems for event record collection, alarm collection, and report generation. Furthermore, these supporting systems allow customers to alter the performance or operation of their applications in near real-time.

Another advantage of the present invention is that the telecommunications architecture allows the NGSN nodes performing the IVR services to communicate with a customer's host computer located on the customer's premises. This allows highly flexible and advanced IVR applications to be performed while handling a call center call. Further features and advantages of the present invention as well as the structure and operation of various embodiments of the invention are described in detail below with reference to the accompanying drawings.

BRIEF DESCRIPTION OF THE INVENTION

The present invention will be described with reference to the accompanying drawings, wherein.

DETAILED DESCRIPTION OF THEN PREFERRED EMBODIMENTS

Overview

The present invention is directed to a telecommunications network architecture for providing call center services using advanced interactive voice response (IVR) service nodes. In a preferred embodiment of the present invention, a customer may have multiple call centers distributed geographically that serve different functions, but are accessed by a single toll-free number. A call to the toll free number requires that any number of varying IVR services be performed by applying a customer's customized IVR application. The advanced interactive service node that performs the IVR applications are referred to herein as next generation service nodes (NGSN). A network using a plurality of NGSNs may determine which function a caller needs by prompting the caller for specific information, collecting that information from the caller, and determining which call center can perform the function needed. The objective is for a telecommunications provider to provide their customers with flexible and reliable IVR services using a highly efficient network of NGSNs.

The present invention is described in terms of the above example environment. This is for convenience only and is not intended to limit the application of the present invention. In fact, after reading the following description, it will be apparent to one skilled in the relevant art how to implement the following invention in alternative embodiments.

Network Architecture

Figure 3A:
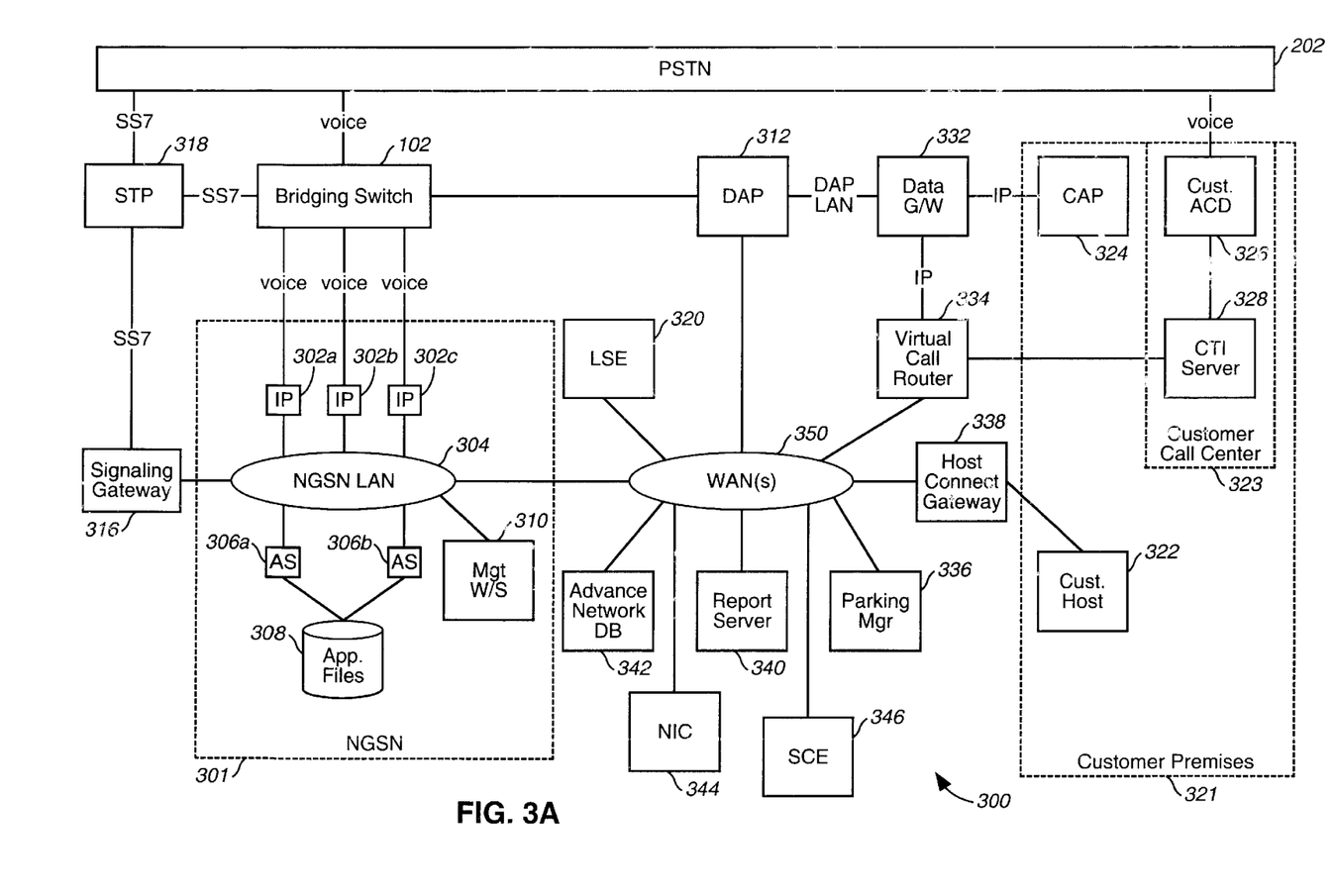
FIG. 3a is a block diagram illustrating the physical architecture of a preferred embodiment of the present invention, showing network connectivity among the various components.

FIG. 3a is a block diagram illustrating a (physical) telecommunications network architecture 300, according to a preferred embodiment of the present invention, showing network connectivity among the various components. Network architecture 300 uses a next generation service node (NGSN) 301 to perform IVR services. Although FIG. 3a shows only one NGSN 301 node, network architecture 300 may include a plurality of NGSN 301 nodes. The NGSN 301 is a computing and telephony platform including a pair of redundant application servers ("AS") 306 (shown as "AS" 306a and 306b), a shared disk array 308, and a plurality of intelligent peripherals ("IP") 302 (shown as IP 302a–302c). The application servers 306 and intelligent peripherals 302 are connected to a local area network (LAN) 304. In a preferred embodiment, LAN 304 is a high-speed switched gigabit Ethernet LAN. The NGSN 301 further includes a management workstation ("Mgt W/S ") 310 which is also connected to the LAN 304. The NGSN 301 is connected to a bridging switch 102, which provides access to a Public Switched Telephone Network (PSTN) (referred to as "switch network") 202. In an alternative embodiment, NGSN 301 can be connected to multiple bridging switches 102. In a preferred embodiment, bridging switch 102 is a Northern Telecom DMS-250 digital matrix switch that supports Release Link Trunk (RLT) voice connections to the NGSN 301 and is well known in the relevant art.

The internal architecture of NGSN 301 is described in detail in a commonly-owned, co-pending application filed concurrently herewith, entitled "Advanced Interactive Voice Response Service Node" having application Ser. No. 09/078,880 incorporated herein by reference in its entirety. Additional special features of NGSN 301 are described in detail in a commonly-owned, co-pending application filed concurrently herewith, entitled "System for Executing Advanced Interactive Voice Response Services using Service-Independent Building Blocks" having application Ser. No. 09/073,887 and "NGSN with Advanced Resource Management" having application Ser. No. 09/074,142, both incorporated herein by reference in their entirety.

Modern switch networks (e.g., PSTN 202) commonly use an out-of-band signaling system. In North America, the American National Standards Institute's (ANSI) Signaling System 7 (SS7) is typical whereas in Europe, the International Telecommunications Union's (ITU) C7 is used. In network architecture 300, a signaling gateway 316 communicates with the bridging switch 102, via a signal transfer point (STP) 318, using SS7. The STP 318 performs switching and routing of SS7 signaling messages among various switches and components in the switch network 202. The NGSN 301 is connected to the STP 318 via the signaling gateway 316. Use of signaling gateway 316 insulates the NGSN 301 from whatever type of signaling system is used in the switch network 202. In other words, signaling gateway 3 16 translates between the signaling protocol used in switch network 202, and the proprietary signaling protocol used in NGSN 301 by the telecommunications service provider. Signaling gateway 316 also performs resource management and call state management for NGSN 301.

A signaling gateway 316 and a telecommunications provider's proprietary signaling protocol are described in detail in commonly-owned, co-pending applications filed concurrently herewith, entitled "Communications Signaling Gateway and System for an Advanced Service Node" having application Ser. No. 09/074,072 and "Call and Circuit State Machine for a Transaction Control Layer of a Signaling Gateway" having application Ser. No. 09/073,885 which are incorporated herein by reference in their entirety.

Still referring to FIG. 3a, an example of the components of a Customer Call Center 323 that interface directly with NGSN 301 is shown. Customer Call Center 323 is physically located on accustomed premises 321. An automated call distributor (AC) 326, within customer premises 321, provides switching and routing of inbound calls to agents, and of outbound calls from agents to the switch network 202. A Computer/Telephony Interface (CTI) Server 328 collects call statistical data from the AC 326, and feeds these data to a network-based virtual call router 334. This provides feedback to the network on call center agent availability, as well as other information used for call processing and customer reporting. Other components of a call center 323, such as agent workstations, call managers, etc., which are well known in the relevant art, are not shown.

Telecommunication networks typically use switches and SCPs 208 to route calls. In network architecture 300, the routing of calls is performed by a data access point (DAP) 312, which is a specific version of a SCP 208. While switches perform routing of dial-1 calls, DAP 312 determines routing for special service calls, such as toll-free 800/888 and Virtual Private Network (VPN) calls. DAP 312 may also be instrumental in routing translations for Local Number Portability. The DAP 312 is also used by NGSN 301 for routing translations for calls transferred from NGSN 301. When a customer application on NGSN 301 determines that a call needs to be extended to the network (call transfer), NGSN 301 sends a routing query to the DAP 312. The DAP 312 responds with a network address for routing the call. Although FIG. 3a shows only one DAP 312, network architecture 300 may contain a plurality of DAPs 312.

Each switch in the switch network 202, including the bridging switch 102, and each of the plurality of NGSN 301, is connected to one of the plurality of DAPs 312 via a high-speed wide area network (WAN) 350. In alternate embodiments, the interface between the DAPs 312 and the other components of the network architecture 300 may be via a telecommunications provider proprietary signaling protocol. Furthermore, a single WAN 350 may be employed, as illustrated in FIG. 3, to connect NGSN 301 to the DAP 312. In an alternate embodiment, a collection of segregated WANs 350 may be employed. Whether one WAN 350 is used, or two or more segregated WANs 350 are used, is dependent upon performance needs of a particular embodiment.

A data gateway 332 provides an external interface and customer access to the DAP 312. The DAP 312 includes multiple computers connected via a DAP LAN, and the data gateway 332 is embodied by another computer also connected to the DAP 312 LAN. The DAP 312 is used to perform enhanced call processing, such as load balancing among multiple destinations, time-of-day routing, and numerous other features. The data gateway 332 allows a customer to perform call processing with their own computing platform. A Customer Access Point (CAP) 324 is located on customer premises 321. The CAP 324 may be either a SCP or an interface to a SCP. When a routing message for a call to the customer is sent by a switch to DAP 312, the DAP 312 will recognize that the call is for a particular customer using any number of factors (e.g., dialed number). The DAP 312 then passes the routing message through the data gateway 332 on to the CAP 324.

In a preferred embodiment, CAP 324 communicates with the DAP 312 via an Internet Protocol (IP) network, using UDP/IP or TCP/IP which is well known in the relevant art. A data gateway 332 is described in detail in a commonly-owned, co-pending application entitled "Remote Data Gateway" having application No. 08/796,246, filed Feb. 7, 1997, which is incorporated herein by reference in its entirety.

The virtual call router 334 also interfaces with the DAP 312 via the data gateway 332. The virtual call router 334 performs enhanced call routing functions that are used for call center 323 routing. These functions include determining the availability of call center 323 destinations, call parking, and resolving routing to one of multiple call center destinations. When a call routing message is received by the DAP 312 for a customer call center 323 call, the DAP 312 forwards the message to the virtual call router 334, via the data gateway 332. The virtual call router 334 may be connected to the data gateway via WAN 350 or by a direct IP connection as shown in FIG. 3a. The virtual call router 334 receives call center statistics from the call center's 323 CTI Server 328. Based on these statistics and pre-loaded routing algorithms, the virtual call router 334 determines where to route a call, and returns to the DAP 312 a physical network routing address. If no available call center 323 terminations exist, the virtual call router 334 may determine to park the call on the network. The NGSN 301 would then serve as a call parking platform.

A parking manager 336 manages the network's call parking resources. Parking resources include NGSN 301 ports and applications. The parking manager 336 tracks the number of available ports and function of these ports at each NGSN 301. The virtual call router 334 queries the parking manager 336 for an available and appropriate parking resource for a call. The parking manager 336 responds with a particular NGSN 301 destination, and the virtual call router 334 sends the address for this destination in a message to the DAP 312. The parking manager 336 communicates with the virtual call router 334 via WAN 350 or by a direct IP connection as shown in FIG. 3a. The parking manager 336 uses WAN 350 to communicate with all of the NGSNs 301 in the network architecture 300.

The parking manager 336 is described in a commonly-owned, co-pending application entitled "Network Call Parking Manager" having application Ser. No. 08/796,839, filed Feb. 7, 1997, and a method and system for call parking and transferring, using this architecture, is described in a commonly-owned, co-pending application entitled "System and Method for Call Park and Transfer in a Telecommunications Network" having application Ser. No. 08/796,840, filed Feb. 7, 1997, which are incorporated herein by reference in their entirety.

Also linked to the WAN 350 is a host connect gateway 338. The host connect gateway 338 may be a computer that provides NGSN 301 with an external interface to customer host computers 322. This enables advanced IVR services to be performed by NGSN 301. Thus, calls handled by NGSN 301 can retrieve data stored on customer host computer 322 located at the customer premises 321.

When NGSN 301 executes an application to handle a call, several event records are generated by the application. These event records are collected by a central process running on the NGSN 301 application server 306. Event records are sent in batches to a report server 340 via the WAN 350. The report server 340 is a computer that provides centralized reporting of NGSN 301 application performance results and call events. It collects all call event information that is generated during an NGSN 301 call, and summarizes the event information into call statistics on a customer application basis. The report server 340 then summarizes event records into call statistics, based on application, and stores these statistical data in databases. A report generation process can generate custom or standard reports for customers for each NGSN 301 application. These reports may be delivered to customers in hardcopy or via e-mail. In a preferred embodiment, however, customers may use the World Wide Web to view reports on-line.

An advanced network database 342 is a computer that embodies a database and database management system. The advanced network database 342 is used to provide NGSN 301 with data pertaining to a customer application. These data control the application's handling of a call, and may be updated in near real-time by a customer in order to tweak the performance or operation of an application. For example, there may be multiple routing plans for a single customer application, with each plan being selected based on some criteria, such as time of day, day of week, caller ANI, or caller input. The NGSN 301 application queries the advanced network database 342 for the appropriate routing plan.

The advanced network database 342 is used in conjunction with the report server 340 to provide a customer with enhanced control over its applications. The customer can view, on-line and in near real-time, its application's call processing statistics on the report server, and determine the current performance of the application. The customer may determine, for example, that a certain destination is always found busy when a call is extended from NGSN 301, and therefore customer calls cannot be completed. The customer may then log onto the advanced network database 342 and change a routing plan to extend calls to another destination, or implement automatic overflow to an alternate destination if the first destination is found busy. Other examples are also possible (e.g., data used to perform "dealer locate," etc.).

A local support element (LSE) 320 is a computer that provides a central point of collection of all network-based alarms. It is connected to each NGSN 301, and other network architecture 300 components, via the WAN 350. Each network architecture 300 component, such as NGSN 301, generates alarms based on certain pre-defined conditions, and embodies a process for collecting its own alarms. For example, each NGSN 301 node uses the management workstation 310 to collect alarms generated by any process on that NGSN 301. The management workstation 310 sends alarms to the LSE 320 via the WAN 350. The LSE 320 collects, stores, and forwards to other systems all alarms collected by NGSN 301 nodes and other network architecture 300 components.

Management workstation 310 is also connected to the NGSN LAN 301. The management workstation 310 monitors the performance of the NGSN 301. It collects alarms from any component of NGSN 301, and stores and forwards alarms to LSE 320 via WAN 350. In a preferred embodiment, management workstation 310 is a common personal computer (PC) with user input means and a monitor. It provides a single point of concentration of all alarms generated by a particular NGSN 301 node, for forwarding of alarms to the LSE 320. It also provides a direct interface of alarms and other messages generated by any NGSN 301 component to a user.

A Network Information Concentrator (NIC) 344 is a computer platform that provides a central point of collection of all network-based event records, including call detail records and billing detail records. It collects records from each switch, DAP 312, and NGSN 301, as well as other network architecture 300 components not shown. Records are sent to the NIC via the WAN 350. A NIC is described in detail in a commonly-owned, co-pending patent application entitled "Network Information Concentrator" having application Ser. No. 08/426,256, filed Apr. 21, 1995, which is incorporated herein by reference in its entirety.

A service creation environment (SCE) 346 is a computing platform used to create NGSN 301 customer applications. The SCE 346 is also used to create and modify audio files used in IVR applications. Once an application or audio file is newly created, it may be distributed to each NGSN 301 via the WAN 350. By centralizing the SCE 346, the overall network architecture for NGSN 301 is highly scaleable because additional NGSN 301 nodes may be added, and subsequently receive all customer applications.

Figure 4:
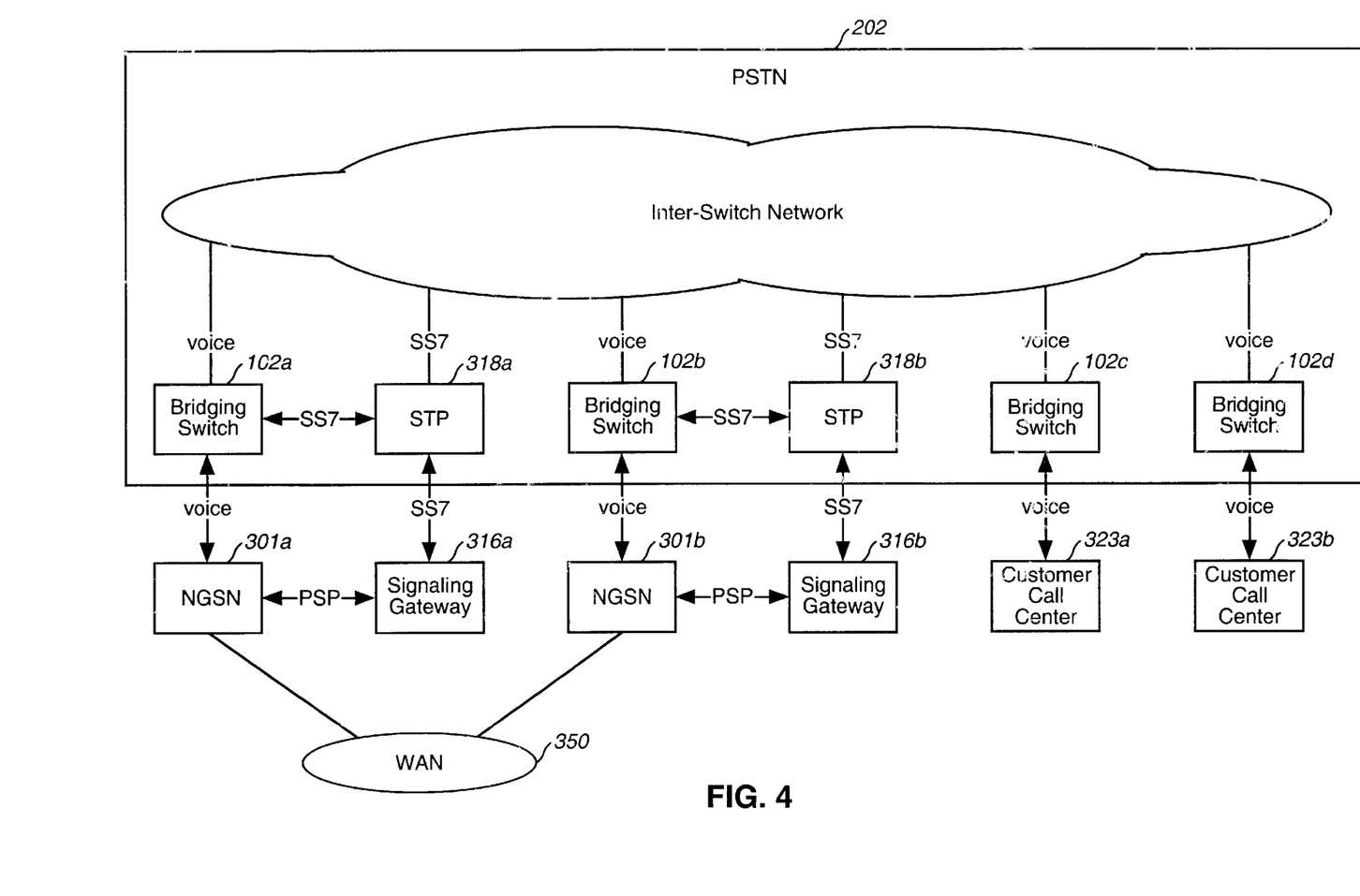
FIG. 4 is a network architecture diagram illustrating how the NGSN architecture of the present invention can be scaled.

FIG. 4 is a network architecture diagram illustrating how the NGSN network architecture 300 may be scaled. A plurality of NGSN 301 nodes (shown as NGSN 301*a* and 301*b*) may be connected to switch network 202 and deployed at various locations. Each NGSN 301 node is connected to the switch network 202 via one or more of the plurality of bridging switches 102 (shown as bridging switch 102*a*–102*d*) using voice trunks. Each bridging switch 102 is part of the switch network 202. Furthermore, each NGSN 301 is connected to a signaling gateway 316 (shown as signaling gateway 316*a* and 316*b*) via data links. In turn, each signaling gateway 316 is connected to one of the plurality of STPs 318 (shown as STP 318*a* and 318*b*) which are also part of the switch network 202. Each NGSN 301 is linked to a WAN 350. The WAN 350 provides each NGSN 301 access to the LSE 320, the parking manager 336, the host connect gateway 338, the report server 340, the advanced network database 342, and the NIC 344 (as shown in FIG. 3*a*).

The architecture shown in FIG. 4 reflects the fact that multiple call centers 323 (shown as call centers 323*a* and 323*b*) may be added to a network, each served by the plurality of NGSN 301 nodes. Any call to a customer may be first routed to any NGSN 301, and then routed to any or to a particular call center 323. There may be one or multiple NGSN 301 nodes connected to one of the plurality of bridging switches 102, as well as one or multiple call centers 323 connected to one of the plurality of bridging switches 102.

Figure 5:
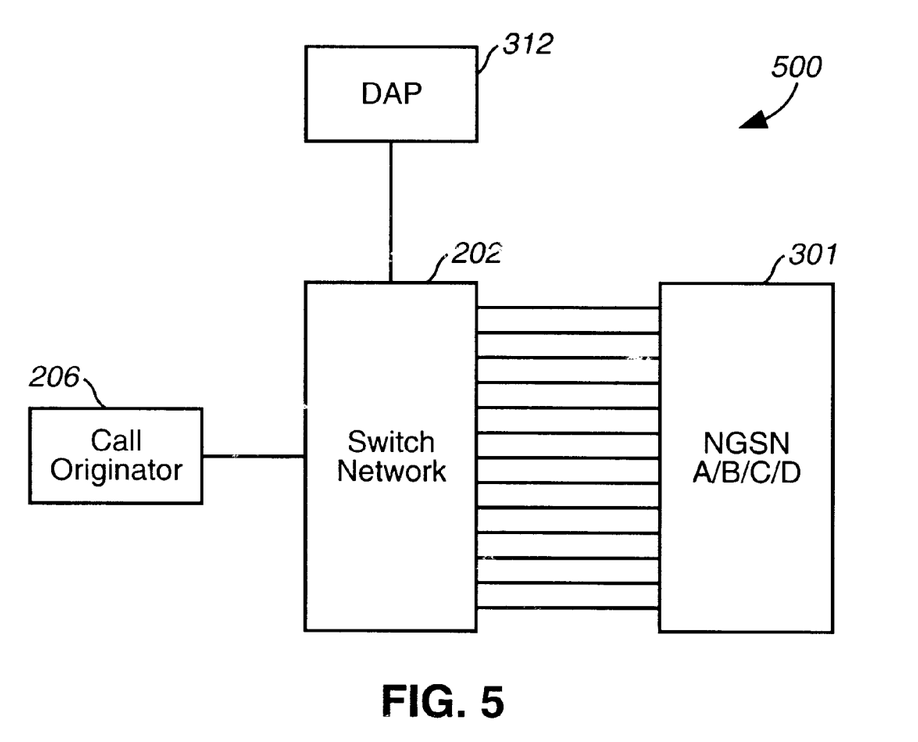
FIG. 5 is a block diagram illustrating a network configuration for providing IVR services, in accordance with the present invention.

FIG. 5 illustrates a network configuration for providing IVR services, in accordance with a preferred embodiment of the present invention. Since each of a plurality of NGSN 301 service nodes is capable of performing all customer applications, any one NGSN 301 service node may be used for any call. Therefore, FIG. 5 presents an exemplary logical configuration that may be used. Four NGSN 301 nodes—A, B, C and D—are presented to an incoming call as one node. A call originator 206 dials a common telephone number. A routing query is issued to the DAP 312. The DAP 312 can then translate the number into a physical routing address for any NGSN 301 node, not just a particular one. Therefore, in contrast to the network configuration 200 of FIG. 2, the network capacity of each NGSN 301 node is available for all calls. In accordance with traffic queuing theories, such as Erlang's, consolidating several small capacity pipes into a single large capacity pipe increases the overall capacity of the network.

Implementation

Figure 3B:
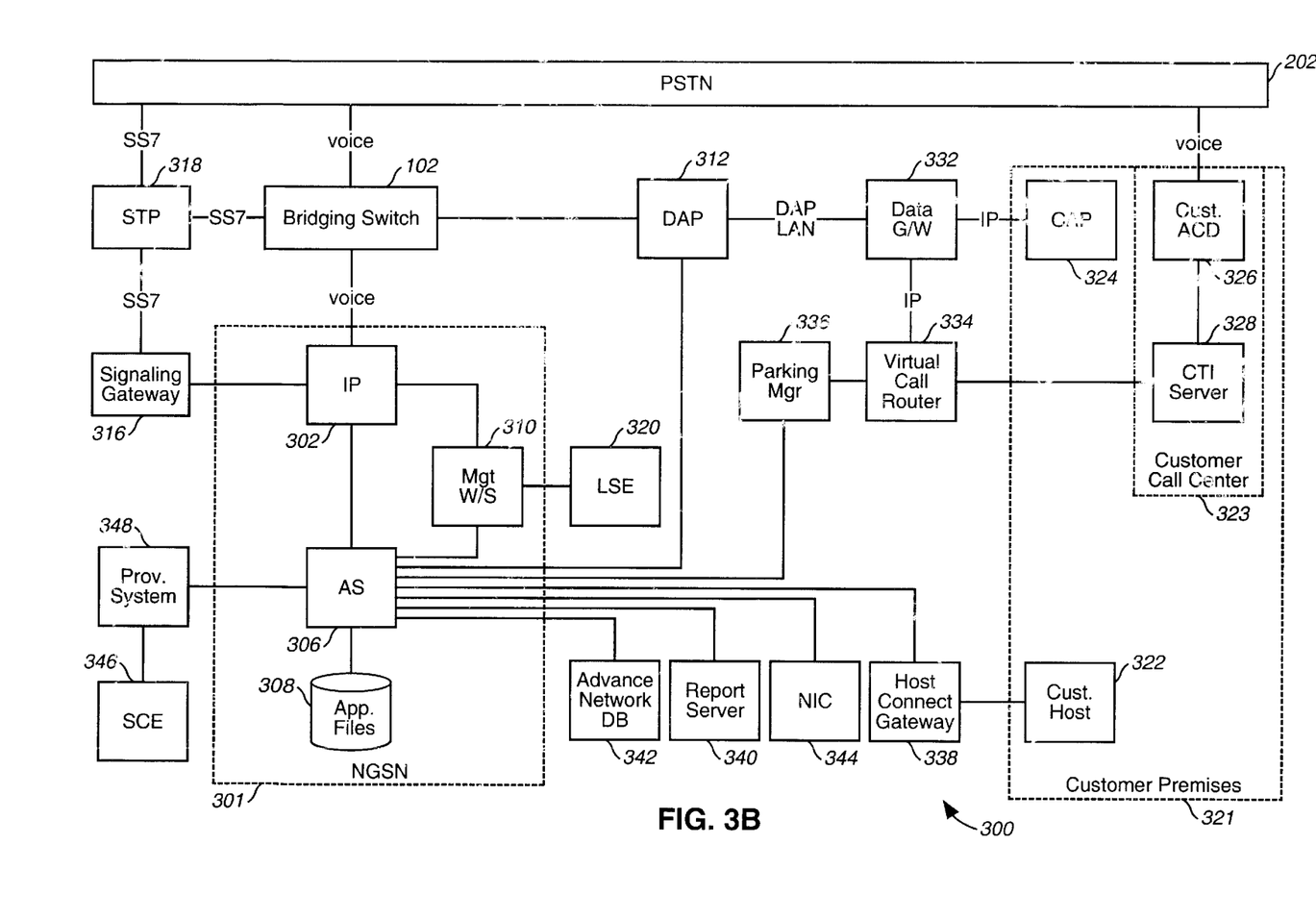
FIG. 3b is a block diagram illustrating the logical architecture of a preferred embodiment of the present invention, showing communications among the various components.
Figure 6A:
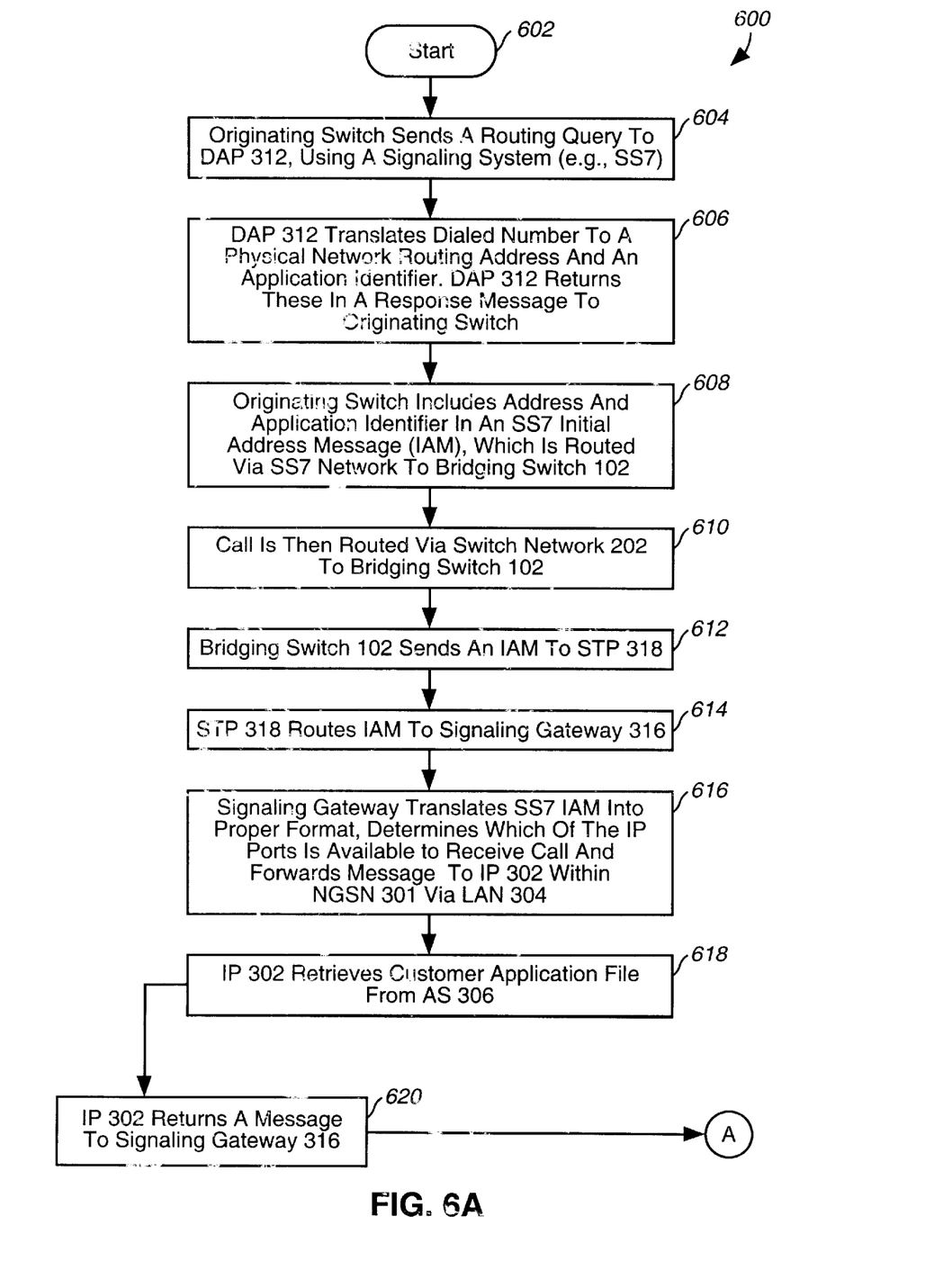
FIGS. 6a–c is a flowchart of a sample IVR call processing in accordance with the present invention.
Figure 6B:
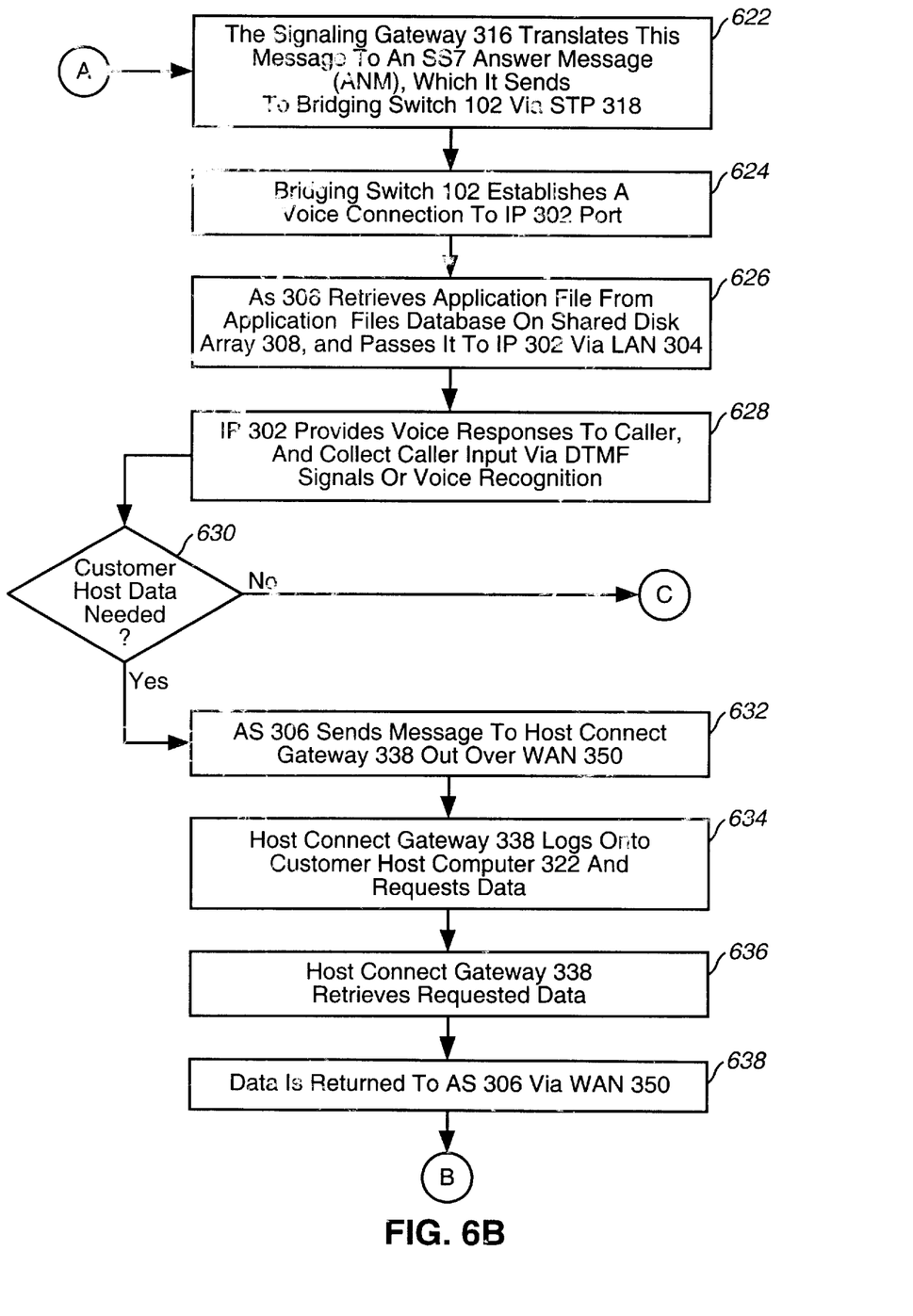
Figure 6C:
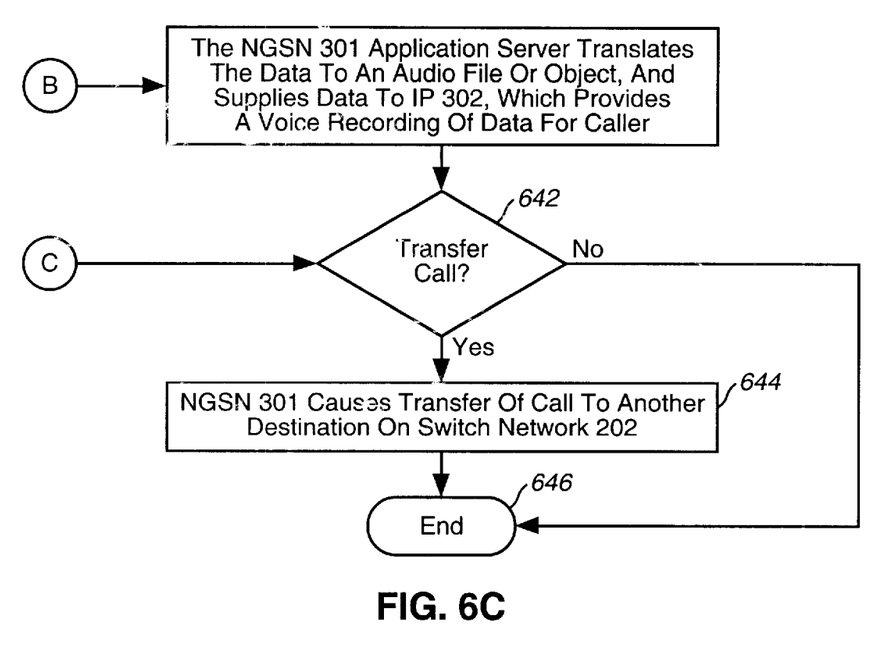

FIGS. 6a–c illustrate a flowchart of a sample IVR call processing 600 reflecting the overall top-level operation of network architecture 300. Interactive voice response call processing 600 can be better understood with reference to FIG. 3b, which is a block diagram showing the communications among the various components of network architecture 300.

Referring to FIG. 6a, IVR call processing 600 begins at step 602 with control passing immediately to step 604. In step 604, a call originates on the switch network (PSTN) 202. The originating switch sends a routing query to the DAP 312, using a signaling system (e.g., SS7). In step 606, the DAP 312 translates the dialed number (i.e., 1-800 number) to a physical network routing address and an application identifier. The DAP 312 returns these in a response message to the originating switch. Translation may be a simple one-for-one translation; more typically, it involves enhanced processing to resolve routing to one of multiple terminations based on various criteria, such as time of day or load balancing algorithms. The network routing address is for the bridging switch 102 trunk group that terminates to an intelligent peripheral ("IP" in FIG. 6) 302 within NGSN 301.

In step 608, the originating switch includes the address and application identifier in an SS7 Initial Address Message (IAM), which is, in step 610, routed via the SS7 network to the bridging switch 102. Before the routing of step 610, the bridging switch 102 sets up the call with NGSN 301, using SS7 signaling to the signaling gateway 316 associated with NGSN 301. To setup the call, the bridging switch 102 sends an IAM to the STP 318 in step 612. The IAM serves as a request for NGSN 301 resources, and includes the dialed number and ANI of the call, as well as the application identifier.

In step 614, the STP 318 routes the IAM to the signaling gateway 316. In step 616, the signaling gateway 316 translates the SS7 IAM into the proper format based on the telecommunications provider's proprietary signaling protocol and forwards that message to the intelligent peripheral 302 within NGSN 301 via the LAN 304. The signaling gateway 316 also determines the port to be used on the intelligent peripheral for the inbound call. In step 618, the intelligent peripheral 302 uses the application identifier to retrieve the appropriate customer application file from the application server 306. In step 620, intelligent peripheral 302 returns a message to the signaling gateway 316.

Referring to FIG. 6b (step 622), the signaling gateway 316 translates this message to an SS7 Answer Message (ANM), which it sends to the bridging switch 102 via the STP 318. The bridging switch 102 then establishes a voice connection to the intelligent peripheral 302 port in step 624. In step 626, the application server ("AS" in FIG. 6) 306 retrieves the application file from the application files database on the shared disk array 308, and passes it to the intelligent peripheral 302 via the LAN 304. In step 628, the intelligent peripheral 302 loads the application and executes it. Execution of the customer IVR application results in the execution of common tasks related to IVR services as would be apparent to one skilled in the relevant art. These include playing voice prompts for the caller, accepting caller input via Dual Tone Multi Frequency (DTMF) signals or voice recognition, and ultimately ending (step 646) or transferring the call (step 644).

During the course of processing the call, at step 630, NGSN 301 may need to issue a query to the customer host computer 322 (described above with reference to FIG. 3a) via the host connect gateway 338. For example, a bank may need the ability to provide a caller with data from the caller's bank account, where such data resides on the bank's host computer (customer host computer 322). The caller's call is first routed to NGSN 301. The NGSN 301 performs a customer application that prompts for the caller's bank account and authorization code, which the caller can enter with DTMF signals, or with spoken words if voice recognition capabilities are applied to the intelligent peripheral 302 port servicing the call. The bank account and authorization code are included in a message that the application server 306 within NGSN 301 sends out over the WAN 350 to the host connect gateway 338 (step 632). In step 634, the host connect gateway 338 then logs onto the customer host computer 322, and provides it with the caller's account and authorization code, along with a request for data. Requested data may be, for example, an account balance.

In step 636, the host connect gateway 338 retrieves the requested data in accordance with the type of customer host computer 322. For example, if the customer host computer 322 is an IBM MVS mainframe, then the host connect gateway 338 employs a 3270 terminal emulator screen scraping application to retrieve the data. In step 638, the data is returned to the NGSN 301 application server 306 via the WAN 350.

Referring to FIG. 6c, The NGSN 301 application server translates the data to an audio file or object, and supplies the data to the intelligent peripheral, which provides a voice recording of the data for the caller. The above example is only illustrative and not exhaustive as numerous other applications of the host connect gateway 338 are possible.

Alternately, as a result of processing a call, NGSN 301 will typically need to transfer the call to another destination on the switch network 202 (steps 642 and 644). This process is well known in the art, as are other IVR features such as Release Link Trunk (RLT), Take Back and Transfer (TNT), and call parking. A typical call process for call park and transfer is described in a commonly-owned, co-pending application entitled "System and Method for Call Park and Transfer in a Telecommunications Network" having application Ser. No. 08/796,840, filed Feb. 7, 1997, which is incorporated herein by reference in its entirety. The NGSN 301 and the architecture shown in FIG. 3 enhance this process by providing a scaleable network architecture, with multiple NGSN 301 destinations, any one of which may be used to park a call. The parking manager 336 tracks the number of ports (with each capability) on each parking node, but does not track individual port availability. When a call arrives at a bridging switch 102 destined for an NGSN 301, NGSN 301 determines which port will accept the call.

The fact that the network shown in FIG. 3 utilizes multiple NGSN 301 nodes for providing IVR services, and that any NGSN 301 may perform any customer IVR application, provides for increased network scaleability and efficiency.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A system for handling call center calls on a telecommunications network and providing advanced interactive voice response services comprising:

receiving means for receiving a call routing query for a call from the telecommunications network, where said call routing query uses a carrier messaging system;

processing means for processing said call routing query to determine a physical routing address and an application identifier based on predetermined criteria;

requesting means for requesting resources on a next generation service node where said next generation service node is identified by said physical routing address;

translating means for translating said call routing query from said carrier messaging system to a telecommunication service provider's proprietary signaling protocol which is understood by said next generation service node;

establishing means for establishing a connection between said call and said next generation service node;

retrieving means for retrieving a customer application file from a shared disk array, where said customer application file is selected based on said application identifier; and executing means for executing said customer application file to perform the interactive voice response services for said call.

2. The system of claim 1, wherein said processing means comprises:

means for translating the dialed number of said call based on at least one of:
   (i) time of day; and
   (ii) a load balancing algorithm.

3. The system of claim 1, wherein said requesting means comprises:

means for parking said call when said resources on said next generation service node are unavailable.

4. The system of claim 1, wherein said executing means comprises:

means for accessing a customer host computer via a customer host gateway where said customer host computer is located remotely from said next generation service node; and means for retrieving data from said customer host computer via said customer host gateway.

5. A system for handling call center calls on a telecommunications network and providing advanced interactive voice response services comprising:

a plurality of next generation service nodes for performing interactive voice response (IVR) services;

a plurality of data access points to route calls from the telecommunications network to said plurality of next generation service nodes;

a signaling gateway which translates between the signaling system used in the telecommunications network and a proprietary signaling protocol used in said plurality of next generation service nodes;

a service creation environment which allows a customer to create application files to be performed on said plurality of next generation service nodes; and a local support element that collects alarms generated by each of said plurality of next generation service nodes during execution of said application files.

6. A method for handling call center calls on a telecommunications network and providing advanced interactive voice response services comprising the steps of:

(1) receiving a call routing query for a call from the telecommunications network, where said call routing query uses a carrier messaging system;

(2) processing said call routing query to determine a physical routing address and an application identifier based on predetermined criteria;

(3) requesting resources on a next generation service node where said next generation service node is identified by said physical routing address;

(4) translating said call routing query from said carrier messaging system to a telecommunication service provider's proprietary signaling protocol which is understood by said next generation service node;

(5) establishing a connection between said call and said next generation service node;

(6) retrieving a customer application file from a shared disk array, where said customer application file is selected based on said application identifier; and (7) executing said customer application file to perform the interactive voice response services for said call.

7. The method of claim 6, wherein step (2) comprises the step of:

translating the dialed number of said call based on at least one of:
   (i) time of day; and
   (ii) a load balancing algorithm.

8. The method of claim 6, wherein step (3) comprises the step of:

parking said call when said resources on said next generation service node are unavailable.

9. The method of claim 6, wherein step (7) comprises the steps of:

(a) accessing a customer host computer via a customer host gateway where said customer host computer is located remotely from said next generation service node; and (b) retrieving data from said customer host computer via said customer host gateway.

* * * * *